(12) United States Patent
Erdogan

(10) Patent No.: US 8,757,649 B2
(45) Date of Patent: Jun. 24, 2014

(54) CONNECTING STRUT

(75) Inventor: Cengiz Erdogan, Geldern (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/638,045

(22) PCT Filed: Mar. 22, 2011

(86) PCT No.: PCT/EP2011/001421
§ 371 (c)(1),
(2), (4) Date: Nov. 27, 2012

(87) PCT Pub. No.: WO2011/120648
PCT Pub. Date: Oct. 6, 2011

(65) Prior Publication Data
US 2013/0069335 A1    Mar. 21, 2013

(30) Foreign Application Priority Data

Mar. 31, 2010   (DE) .......................... 10 2010 013 518

(51) Int. Cl.
*B60G 3/12* (2006.01)

(52) U.S. Cl.
USPC ....... 280/124.128; 280/124.134; 280/124.153

(58) Field of Classification Search
USPC ..................... 280/124.128, 124.134, 124.153
See application file for complete search history.

(56) References Cited

U.S. PATENT DOCUMENTS

| | | | | |
|---|---|---|---|---|
| 1,380,659 A * | 6/1921 | Layman | ........................... | 74/559 |
| 1,903,064 A * | 3/1933 | Onstott | ........................... | 74/588 |
| 1,913,513 A * | 6/1933 | Rossman et al. | ............... | 403/152 |
| 3,603,173 A | 9/1971 | Brooks | | |
| 4,369,742 A * | 1/1983 | Everts | ......................... | 123/193.6 |
| 4,465,392 A * | 8/1984 | Lang | ................................ | 403/24 |
| 4,480,498 A * | 11/1984 | Konig | .......................... | 74/579 R |
| 4,813,507 A | 3/1989 | Tanaka et al. | | |
| 5,165,306 A * | 11/1992 | Hellon | ........................... | 74/588 |
| 5,607,177 A * | 3/1997 | Kato | ...................... | 280/124.134 |
| 5,800,024 A | 9/1998 | Steimmel et al. | | |
| 6,030,570 A * | 2/2000 | McLaughlin | .................. | 264/279 |
| 6,241,267 B1 * | 6/2001 | Dziadosz et al. | ...... | 280/124.134 |
| 6,250,657 B1 * | 6/2001 | Valin et al. | .................. | 280/124.1 |
| 6,276,710 B1 * | 8/2001 | Sutton | .......................... | 280/678 |
| 6,324,940 B1 * | 12/2001 | Pazdirek et al. | ............ | 74/579 R |
| 6,375,203 B1 * | 4/2002 | Warinner et al. | ............ | 280/81.6 |

(Continued)

FOREIGN PATENT DOCUMENTS

DE    2058028    6/1971
DE    3535783 C2    12/1988

(Continued)

OTHER PUBLICATIONS

German Search Report for Case No. T13153 US dated Oct. 28, 2010.

(Continued)

*Primary Examiner* — Nicole Verley
(74) *Attorney, Agent, or Firm* — MacMillan, Sobanski & Todd, LLC

(57) ABSTRACT

A connecting strut for a chassis of a vehicle comprises an elongated carrier which has at least two carrier elements spaced apart from each other. The carrier elements are connected with each other at their ends by means of a respective connecting element. The carrier has a low torsional stiffness and a high bending stiffness with respect to its longitudinal axis.

20 Claims, 4 Drawing Sheets

(56) References Cited

U.S. PATENT DOCUMENTS

| | | |
|---|---|---|
| 6,382,649 B1 | 5/2002 | Albers et al. |
| 6,457,729 B2 | 10/2002 | Stenvall |
| 6,557,318 B2 * | 5/2003 | Graber .................... 296/190.05 |
| 6,851,689 B2 * | 2/2005 | Dudding et al. ........ 280/124.128 |
| 6,913,273 B2 * | 7/2005 | Drabon et al. .......... 280/93.502 |
| 7,159,880 B2 * | 1/2007 | Budde et al. ........... 280/124.128 |
| 7,506,444 B2 * | 3/2009 | Weise ........................ 29/897.2 |
| 7,575,244 B2 * | 8/2009 | Howell et al. .......... 280/124.134 |
| 7,832,102 B2 * | 11/2010 | Ide et al. ..................... 29/897.2 |
| 7,926,761 B2 * | 4/2011 | Coupe et al. .............. 244/102 R |
| 7,963,536 B2 | 6/2011 | Budde |
| 8,267,415 B2 * | 9/2012 | Jeong .................... 280/124.133 |
| 8,322,738 B2 * | 12/2012 | Haas et al. ............. 280/124.128 |
| 2003/0030241 A1 | 2/2003 | Lawson |
| 2004/0075234 A1 * | 4/2004 | Seksaria et al. ........ 280/124.134 |
| 2006/0232038 A1 * | 10/2006 | Weise .................... 280/124.134 |
| 2011/0133425 A1 * | 6/2011 | Jeong .................... 280/124.134 |
| 2012/0098229 A1 * | 4/2012 | Hochapfel et al. ..... 280/124.134 |
| 2012/0161413 A1 * | 6/2012 | Subbarayalu et al. . 280/124.128 |

FOREIGN PATENT DOCUMENTS

| | | |
|---|---|---|
| DE | 3921468 C1 | 5/1990 |
| DE | 4441971 A1 | 5/1996 |
| DE | 10237658 A1 | 4/2003 |
| DE | 10153799 A1 | 5/2003 |
| DE | 60005055 T2 | 6/2004 |
| DE | 19933432 B4 | 7/2005 |
| DE | 60119216 T2 | 2/2007 |
| DE | 102006030099 B4 | 10/2008 |
| EP | 1712379 A1 | 10/2006 |
| WO | 0242660 A1 | 5/2002 |
| WO | 2009144570 A1 | 12/2009 |

OTHER PUBLICATIONS

Information Disclosure Statement for PCT/EP2011/001421 dated Jun. 20, 2011.

* cited by examiner

Prior Art

CONNECTING STRUT

CROSS-REFERENCE TO RELATED APPLICATIONS

This application is a national stage of International Application No. PCT/EP2011/001421 filed Mar. 22, 2011, the disclosures of which are incorporated herein by reference in entirety, and which claimed priority to German Patent Application No. DE 10 2010 013 518.6 filed Mar. 31, 2010, the disclosures of which are incorporated herein by reference in entirety.

BACKGROUND OF THE INVENTION

The invention relates to a connecting strut, in particular for a chassis of a vehicle.

To connect an axis or a wheel suspension of a vehicle with the vehicle body, connecting struts, so-called links are often used. The links are fastened for pivoting movement, on the one hand, to the vehicle body, and, on the other hand, to the axis or the wheel suspension by means of a bearing, so that a movement of the wheel suspension in the vertical direction (compression and rebounding) is possible. However, upon compression, the wheel orientation, the so-called camber of the wheel suspension may possibly be changed in addition to the vertical position of the wheel suspension, for example when a wheel compresses unilaterally. The wheel suspension is then pivoted about an axis extending along the longitudinal axis of the vehicle. The torsion thus generated must be compensated by the bearings by means of which the connecting strut is connected with the vehicle body or the wheel suspension. The design and manufacturing of such bearings which permit this relative rotation are however complicated and costly.

Document DE 101 53 799 A1 shows a connecting strut which is composed of an elongated base body and two terminal bearing receptions for introducing and evacuating forces. The base body is made of a unit at least composed of a flat metal insert and a plastic structure which forms the remaining contour and is realized by injection molding around the metal insert. The metal insert is configured in a solid manner, which leads to a comparatively high torsional stiffness. The connecting strut can furthermore have a curvature in the plane of the center metal insert, the torsional stiffness thus being also comparatively high.

Document DE 39 21 468 C1 shows a connecting strut according to the generic part of claim 1 in the form of a link for motor vehicle wheel suspensions. Such a link is formed of two identical compression molding pieces each comprising at one end an annular collar, these annular collars being directed towards each other. The compression molding pieces extend parallel to each other and have along the majority of their longitudinal extension a flat U-shaped cross-section, the U-legs bent from a web of this cross-section being directed towards each other. This configuration of the compression molding pieces gives the connecting strut a comparatively high torsional stiffness.

BRIEF SUMMARY OF THE INVENTION

A feature of the invention is to provide a connecting strut for a chassis of a vehicle which on the whole permits a less costly design.

A connecting strut according to the invention serves in particular for use for a chassis of a vehicle. The connecting strut comprises an elongated carrier which has at least two carrier elements spaced apart from each other. The carrier elements are connected with each other at their ends by means of a respective connecting element. The carrier has a high bending stiffness and pressure resistance with respect to the longitudinal axis of the connecting strut, but has a low torsional stiffness. The invention is based on the basic idea to absorb (at least an essential part of) the unavoidable torsion between the two ends of the carrier elements, for example at bearing positions on the vehicle body and on the wheel axis or the wheel carrier by a twisting or torsion of the connecting strut itself, rather than by the rubber bearings usually used. To this end, the connecting strut is configured with a comparatively low torsional stiffness and at the same time with a high bending stiffness. This leads to a reduction of the relative rotation which is to be absorbed by the supports of the connecting strut that could be provided at the ends of the carrier elements, so that the supports can be designed in a simpler manner and with a lower weight. Therefore, the overall manufacturing costs for the connecting strut can be reduced considerably. In addition, the connecting strut can on the whole be designed to have a lower weight as no high torsional forces are to be transmitted.

Within the meaning of the invention, the resistance of the carrier to a bending transversely to its longitudinal axis, i.e. its "bending stiffness" is to be understood synonymously with the property "buckling resistance". This means that the connecting strut does not simply buckles in case of an external load application on at least one of its ends in the direction of its longitudinal axis.

In an advantageous further development of the invention, at least one carrier element can have a rectangular cross-section having substantially straight long sides. Such a carrier element is configured in the form of a plate so that the carrier element thus has a low torsional stiffness. A simultaneously high bending stiffness can be achieved in that the two carrier elements are connected with each other at least at one point along the longitudinal axis of the connecting strut.

In an advantageous further development of the invention, at least one carrier element may have an open profile cross-section, the open area of this profile cross-section being directed outwards away from the respective other carrier element. An open profile cross-section generally leads to a low torsional stiffness. The use of carrier elements having such an open profile cross-section thus gives the connecting strut according to the invention the desired low torsional stiffness. Furthermore, a carrier element having such an open profile cross-section can have a curved configuration at least in the area of its neutral axis in the direction of the respective other carrier element. In the area of its neutral axis, this carrier element thus has a smaller distance with respect to the other carrier element than its outer edge region. It is appropriate that none of the carrier elements of the connecting strut has an angled area in its cross-section, so that a low torsional stiffness is thus ensured.

The carrier of the connecting strut can for example have at least two parallel carrier elements. For the same weight, it is thus possible to achieve a high bending stiffness and pressure resistance without a high torsional stiffness being produced. As viewed in cross-section, the carrier element can be arranged symmetrically to the longitudinal axis of the carrier.

The parallel carrier elements are preferably connected with each other only at their ends and are otherwise decoupled from each other. It is thus ensured that an unhindered torsion of the carrier or of the carrier elements is permitted. The connecting strut can deform uniformly over the entire length, so that the torsional load can be distributed uniformly to the entire length of the carrier.

In a preferred embodiment, the carrier elements have a cross-section having the shape of a U or of a segment of a circle. Owing to the configuration of such a cross-section, the bending stiffness and the pressure resistance of the carrier elements and thus of the connecting strut can be increased, so that a further reduction of weight is possible.

In this embodiment, the outer edges of the carrier elements are preferably directed away from each other.

In an advantageous further development of the invention, the connecting elements by means of which the carrier elements are connected with each other at their respective ends, can twist relative to each other at an angle of up to 20° in case of an external force application. Such a twisting or torsion of the carrier takes place solely in the purely elastic range. This maximum angle, at which the connecting elements can twist relative to each other at the ends of the carrier elements can preferably amount to up to 10°, more preferably to up to 5°. Here, it is not important whether a torsional movement is present only for one connecting element or for both elements (in the opposite direction). It is only important that the two connecting elements can twist relative to each other in the mentioned angular range at the respective ends of the carrier elements, as a result of which the low torsional stiffness of the connecting strut is developed.

In an advantageous further development of the invention, at least one support element can be provided which encloses the carrier elements on their periphery. In the simplest form, such a support element can be configured as a ring which encloses the carrier elements around their periphery. This support element improves the bending stiffness of the connecting strut as a movement or buckling of the carrier elements outwards away from each other in the area of this support element is impossible. Alternatively, the support element can also be configured in the form of a pipe sleeve extending along the longitudinal axis of the carrier and enclosing the periphery of the carrier elements in the same way as a ring.

In an advantageous further development of the invention, at least one connecting element by means of which the carrier elements are connected with each other at their ends can be made of a bearing or a bearing part, preferably of a rubber bearing. To reduce the manufacturing costs, the carrier elements may be welding to such a bearing part. A separate manufacturing of the carrier elements and of the bearing part and a simple subsequent connection of these parts is therefore possible.

Rubber bearings are preferably arranged in the bearing parts, by means of which the connecting strut is fastened for pivoting movement to the vehicle body and to the wheel suspension. Due to the rubber bearings, shocks are absorbed and a required elasticity of the chassis is maintained. Furthermore, the rubber bearings permit a small twisting so that they can absorb part of the torsion.

The longitudinal axes of the bearings are preferably oriented perpendicularly to the longitudinal axis of the carrier, so that they extend transversely to the direction of torsion of the connecting strut.

The strut is for example a trailing link, in particular for the chassis of a truck.

Other advantages of this invention will become apparent to those skilled in the art from the following detailed description of the preferred embodiments, when read in light of the accompanying drawings.

DETAILED DESCRIPTION OF THE INVENTION

Figure 1:
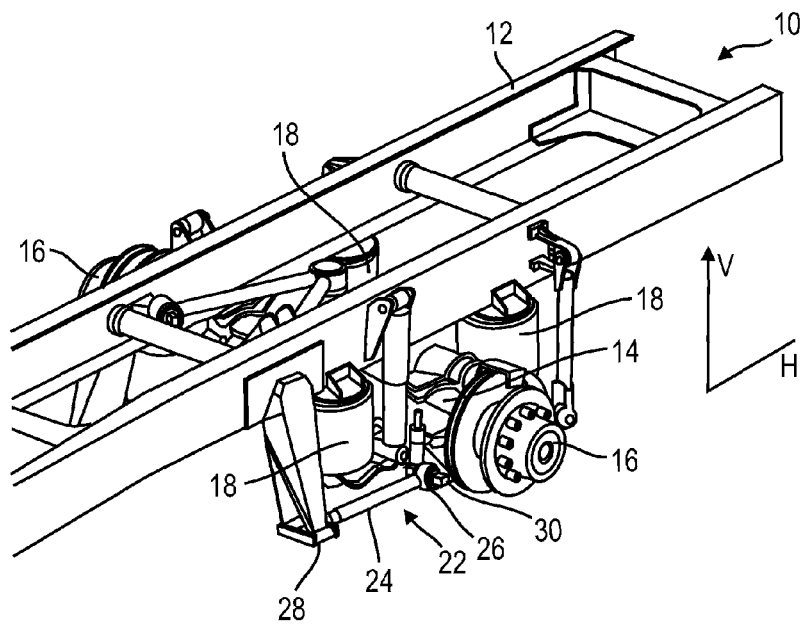
FIG. 1 shows a chassis of a vehicle.

The vehicle body 10 of a truck shown in sections in FIG. 1 includes a frame 12 to which an axle 14 is mounted. The axle 14 has two wheel mounts 16 to which one respective wheel can be fastened. In order to cushion shocks on the axle 14 or on the wheel suspensions 16, the axle 14 is mounted to the frame 12 so as to be movable to a limited extent in the vertical direction V. The wheel suspensions are each provided with two respective spring elements 18 which are arranged between the frame and the wheel suspension 16 or the axle 14, and which are adapted to absorb or cushion a vertical movement of the axle 14. To stabilize the axle 14 or the wheel mount 16 in the horizontal direction H, each wheel suspension 16 is provided with a connecting strut 22, a so-called trailing link.

The connecting strut 22 has a carrier 24 resistant to bending and pressure, and two bearing parts 26, 28 arranged at the ends of the connecting strut 22. Each bearing part serves as a housing for a rubber bearing, in which one respective joint pin 30, 32 is mounted (cf. FIG. 2). The connecting strut 22 is mounted for pivoting movement to the wheel suspension 16 and to the frame 12 by means of these joint pins 30, 32.

Upon compression of the axle 14 in the vertical direction V, the connecting strut 22 is pivoted about the bearing part 28 mounted to the frame 12. It thus guides the axle 14 in the horizontal direction H. When the axle 14 is compressed obliquely to the vertical direction, the orientation of the wheel suspension 16, the so-call camber is also modified. In other words, the wheel suspension is pivoted about an axis extending parallel to the longitudinal axis of the vehicle. The joint pin 30 fastened to the wheel suspension 16 is twisted with respect to the joint pin 32 fastened to the frame, so that a torsional load is acting.

Figure 2:
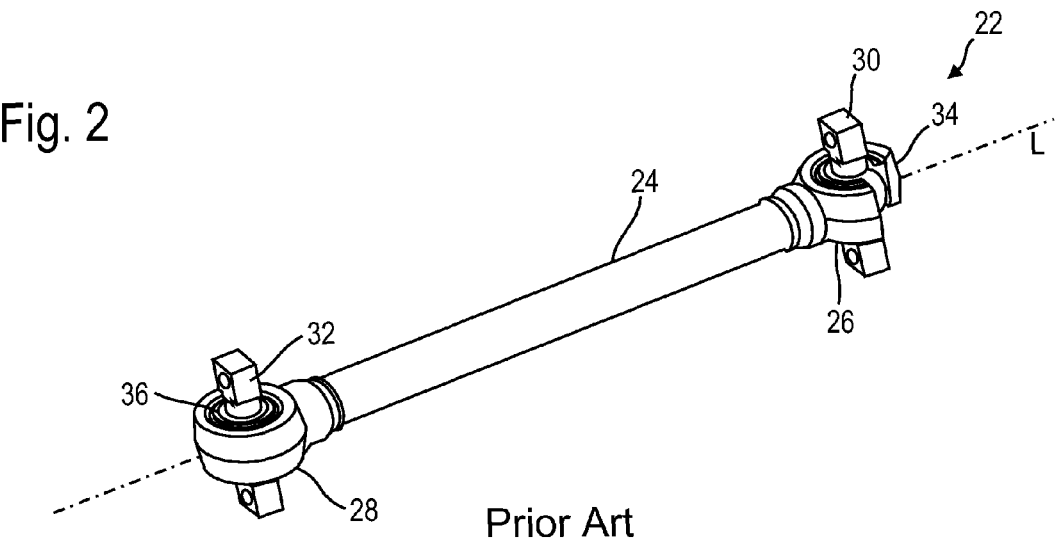
FIG. 2 shows a connecting strut according to the prior art.

FIG. 2 shows a connecting strut according to the prior art. It comprises a tubular carrier 24 which is very resistant to torsion for geometrical reasons (closed circular cross-section).

The joint pins 30, 32 each have a spherical thickened portion 34, 36 which is supported in the respective bearing part 26, 28. The bearing parts 26, 28 form along with the joint pins 30, 32 a so-called molecular joint body. Such a molecular joint body permits a movement of the point pins 30, 32 mounted therein about several degrees of freedom. On the one hand, the joint pins 30, 32 can be rotated about their longitudinal axis. On the other hand, the joint pins 30, 32 can be twisted at a defined angle about the longitudinal axis L of the connecting strut 22 or of the carrier 24, so that a twisting of the joint pins 30, 32 relative to each other can be compensated in the bearing parts 26, 28. The manufacture and the mounting of such joint bodies are however very complicated and expensive.

Figure 3:
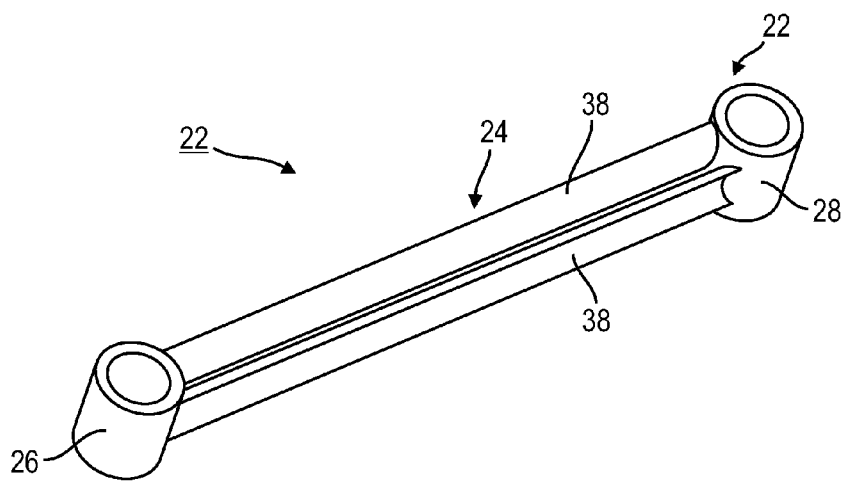
FIG. 3 shows a connecting strut according to the invention.

In contrast thereto, the connecting strut 22 according to the invention shown in FIG. 3 includes a carrier 24 having a very much lower torsional stiffness and at the same time a high bending or bucking resistance. In the embodiment shown here, the carrier 24 includes two carrier elements 38 which are arranged parallel to each other and which are connected with each other only at their respective ends by means of suitable connecting elements in the form of bearing parts 26, 28. In a variation of the illustration of FIG. 3, the carrier 24 may also have more than two carrier elements 38.

The term "low torsional stiffness" means with respect to the connecting strut 22 according to the invention that the ends of the carrier elements 38 can be twisted relative to each other at a predetermined angle, this twisting taking place in a purely elastic range of the carrier 24. This angle can take a value of 20°, preferably a value of 10°, and more preferably a value of 5°. This means that the bearing parts 26, 28 fastened to the ends of the carrier elements 38 can be twisted at such an angle relative to each other with respect to the longitudinal axis of the carrier 24.

Both carrier elements 38 extend in the longitudinal direction of the carrier 24 substantially parallel to and at a small distance from each other. Alternatively, it is also possible that the carrier elements 38 enclose an acute angle with their respective longitudinal axis. Both carrier elements 38 are configured substantially in a straight line, so that they have no curvature in the direction of their longitudinal axis. This supports the desired low torsional stiffness of the carrier 24 with respect to its longitudinal axis.

The carrier elements 38 are welded to the bearing parts 26, 28 and are otherwise decoupled from each other. This means that there is no connection between the carrier elements 38 along the longitudinal axis of the carrier 24, so that the carrier elements can be twisted independently of each other. The carrier elements 38 can however be also be partly connected with each other for stabilizing purposes. The bearing parts 26, 28 are here configured in a cylindrical manner for the mounting of a cylindrical joint pin.

Figure 4:
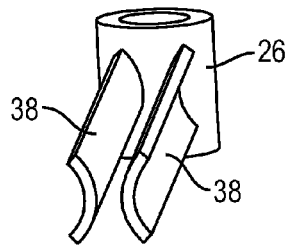
FIG. 4 shows a sectional view through the connecting strut of FIG. 3.

As can be seen in FIG. 4, the carrier elements 38 have a cross-section having the shape of a segment of a circle, the outer edges of the carrier elements 38 being respectively directed away from each other and in this case thus pointing outwards. Due to this shape of the carrier elements 38, the carrier 24 has a very high bending stiffness and pressure resistance and has at the same time a very low weight. Further cross-sectional shapes are also conceivable instead of the cross-section having the shape of a segment of a circle as illustrated here. It is for example also possible that the carrier elements 38 have a U-shaped or an angular cross-section. In any case, it turned out to be advantageous that the carrier elements 38 respectively have an open profile cross-section, the open area of the profile cross-section being directed outwards away from the respective other carrier element.

Figure 5:
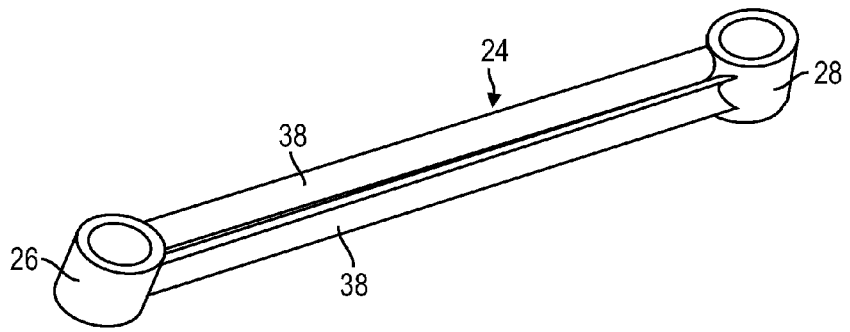
FIG. 5 shows a view of the connecting strut of FIG. 3 in a twisted state.

As a result of its low torsional stiffness, the carrier 24 can be twisted about its longitudinal axis L when the joint pins are twisted (cf. FIG. 5). In this case, it is not necessary that the bearings arranged in the bearing parts 26, 28 compensate any torsion, or they must compensate only a low torsion, so that they can be manufactured in a considerably simpler and more compact manner.

Figure 6:
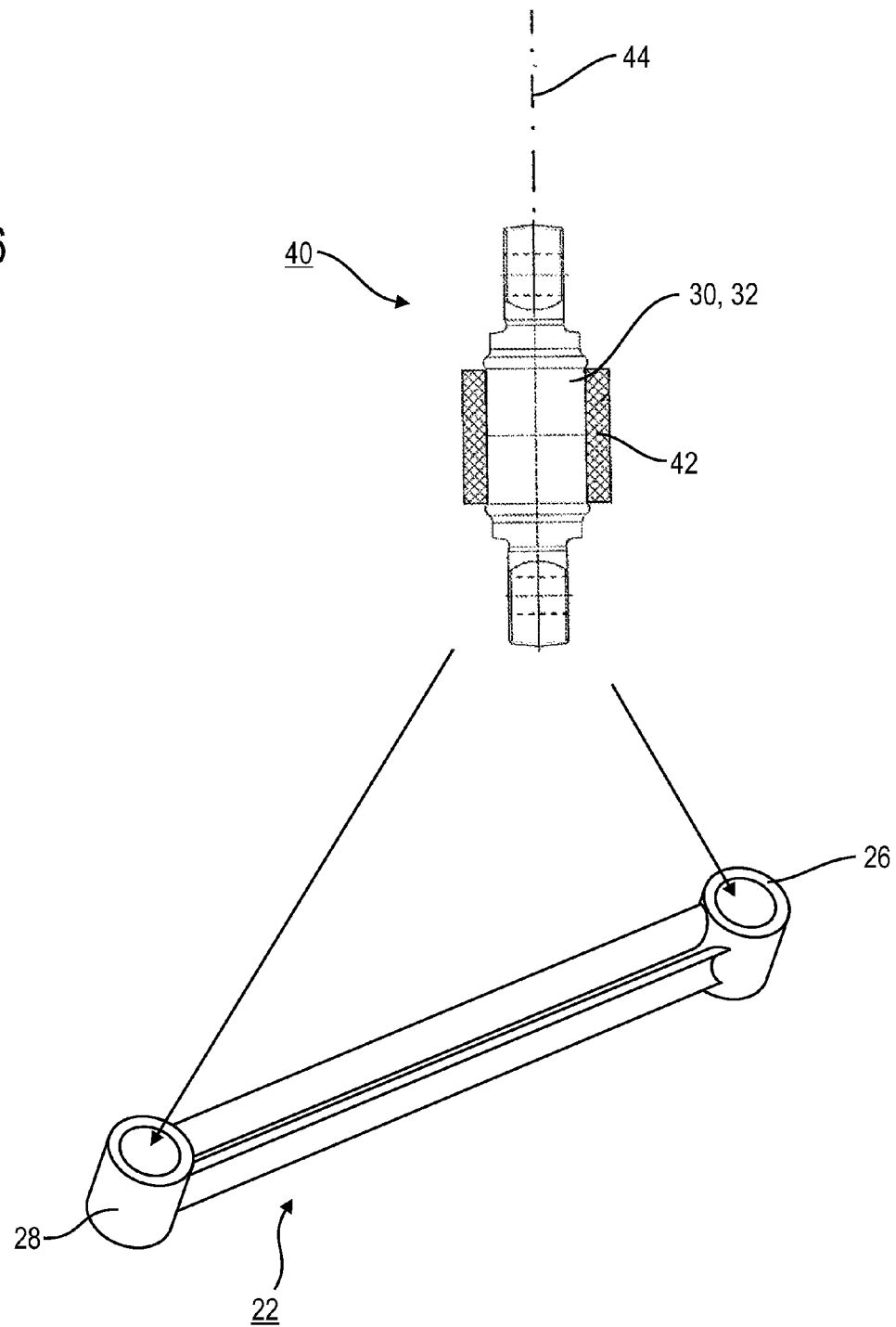
FIG. 6 shows the connecting strut of FIG. 5, a rubber bearing which is mounted to bearing parts of the connecting strut being illustrated in a cross-sectional view.

FIG. 6 shows the connecting strut 22 of FIG. 5 in connection with a rubber bearing 40 shown in a cross-sectional view, which is provided for reception in the bearing parts 26, 28. The rubber bearing 40 comprises the joint pin 30, 32 and a rubber element 42 which encloses the joint pin 30, 32 radially. The outer diameter of the rubber element 42 is adapted to an inner diameter of a respective bearing part 26, 28. In the mounted stage, the rubber bearing forms along with the bearing parts 26, 28 the molecular joint body mentioned above.

For the functioning of the connecting strut 22, when used in a chassis of a motor vehicle or similar, it is important that the joint pins 30, 32 can be twisted with respect to the rubber element 40 at least about their longitudinal axis 44. Instead of a rubber element, a different component, for example a plastic sleeve or similar, can come into consideration for a mounting of the joint pins 30, 32 in the bearing parts 26, 28, as long as the discussed torsion ability of the joint pins 30, 32 about their longitudinal axis 44 is ensured.

Figure 7:
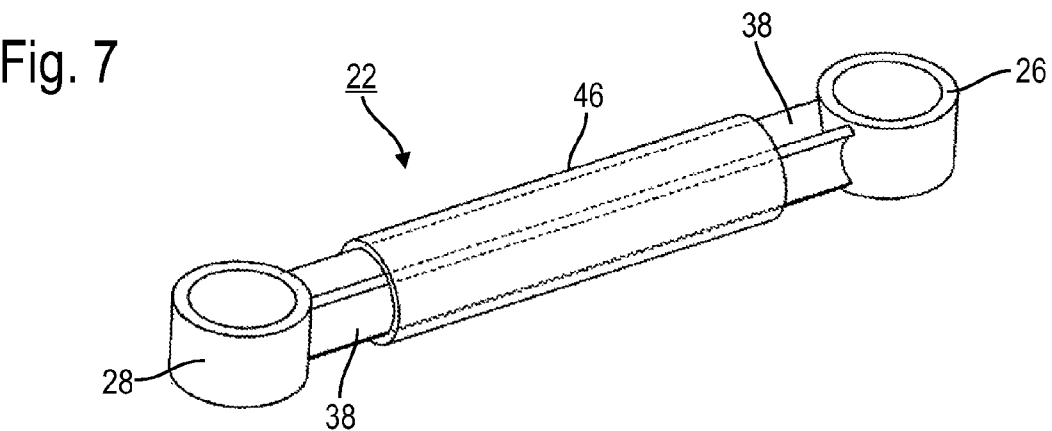
FIG. 7 shows the connecting strut in a further embodiment.
Figure 8:
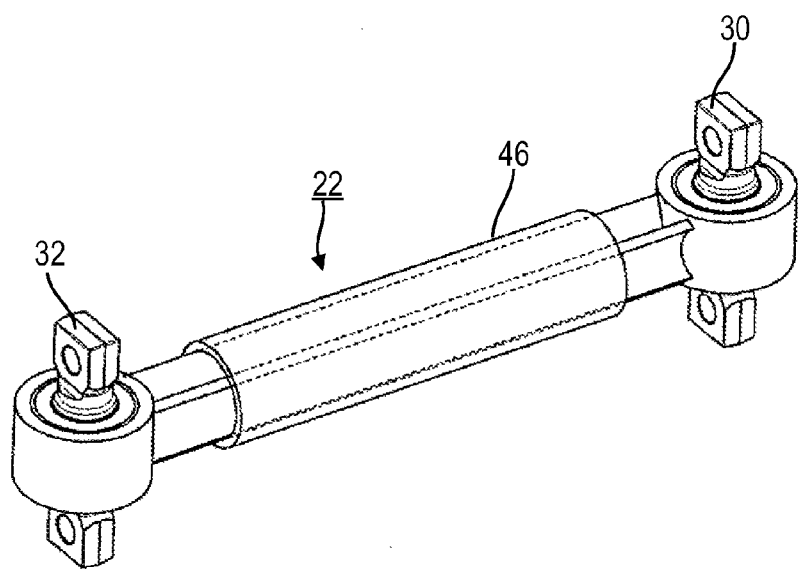
FIG. 8 shows the connecting strut of FIG. 7 with rubber bearings mounted therein.

FIGS. 7 and 8 illustrate a further embodiment for the connecting strut 22 according to the invention. FIG. 7 shows a perspective view of the connecting strut 22, in which the two carrier elements 38 are connected with each other at their respective ends by means of a bearing part 26, 28, as discussed above. In this embodiment, a support element 46 in the form of a pipe sleeve is additionally provided, which encloses the two carrier elements 38 along their periphery. The pipe sleeve 46 can suitably be fastened to the periphery of the carrier elements 38, for example by bonding, spot welding or similar. Alternatively, the pipe sleeve 46 can be retained in a form-fitting manner with respect to at least one carrier element, so that the pipe sleeve 46 is secured against an axial shifting in the direction of the longitudinal axis of the carrier 24. The pipe sleeve 46 causes that the two carrier elements 38 cannot buckle outwards or be bent away in case of an external force application. Accordingly, the pipe sleeve 46 improves the bending stiffness of the connecting strut 22. Alternatively to the shown embodiment of a pipe sleeve 46, the support element can also be configured in the form of a ring, a plurality of individual rings along the longitudinal axis of the carrier 24 being also possible. The effect of such a ring or of such rings is the same as that of the pipe sleeve 46, namely to avoid a buckling of the carrier elements 38 outwards.

The connecting strut 22 is composed of single parts, namely the cylindrical bearing parts 26, 28 and the cup-shaped carrier elements 38, that are easy to manufacture. These components can be manufactured individually with low expenditure and can be connected in an inexpensive manner by welding. It is however also conceivable that the components of the connecting strut 22 are connected with each other in another way or using a different method. The connecting strut can for example also be manufactured by forging or by a suitable metal casting method.

In the present case, the connecting strut 22 is illustrated as a trailing link in a chassis of a truck. The connecting strut according to the invention can however also be used on a different component of the chassis.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A connecting strut for a chassis of a vehicle comprising an elongated carrier having at least two carrier elements wholly spaced apart from contact with each other which are connected with each other at their ends by a respective connecting element, wherein the carrier has a low torsional stiffness and a high bending stiffness with respect to its longitudinal axis, wherein a cross-section of at least one carrier element has the shape of a rectangle the long sides of which are curved towards the respective other carrier element at least in a region of a neutral axis, wherein the curved carrier element has only a uniform open profile cross-section throughout an entire length thereof extending between the associated ends thereof, wherein the open profile cross-section is directed outwards away from the respective other carrier element and terminates in a pair of outermost edges, and wherein the curved carrier element has in the region of the neutral axis a smaller distance from the other carrier element than from the outermost edges thereof.

2. The connecting strut according to claim 1, wherein at least one carrier element has a rectangular cross-section having substantially straight long sides.

3. The connecting strut according to claim 1, wherein at least one carrier element has an open profile cross-section, the open area of the profile cross-section being directed outwards away from the respective other carrier element.

4. The connecting strut according to claim 1, wherein the connecting elements by means of which the carrier elements are connected with each other at respective ends thereof can be twisted relative to each other at an angle of up to 20° in case of an external force application, the carrier being twisted elastically.

5. The connecting strut according to claim 4, wherein the connecting elements can be twisted relative to each other at an angle of up to 10°.

6. The connecting strut according to claim 4, wherein the connecting elements can be twisted relative to each other at an angle of up to 5°.

7. The connecting strut according to claim 1, wherein at least one support element is provided which encloses the carrier elements on a periphery thereof.

8. The connecting strut according to claim 7, wherein the support element is configured in the form of a ring or in the form of a tube extending along the longitudinal axis of the carrier.

9. The connecting strut according to claim 7, wherein the support element is fixed in a form-fitting manner with respect to at least one carrier element or is fastened to at least one carrier element.

10. The connecting strut according to claim 1, wherein at least one connecting element is formed of a bearing.

11. The connecting strut according to claim 10, wherein the bearing is suitable for supporting a joint, a joint axis extending substantially perpendicularly with respect to the longitudinal axis of the carrier.

12. The connecting strut according to claim 1, wherein the carrier elements are welded to a connecting element.

13. The connecting strut according to claim 1, wherein the connecting elements are a part of the vehicle chassis.

14. The connecting strut according to claim 1, wherein the connecting strut is made in one piece.

15. The connecting strut according to claim 1, wherein the connecting strut is a trailing link.

16. The connecting strut according to claim 1, wherein at least one connecting element is formed of a rubber bearing.

17. A connecting strut for a chassis of a vehicle comprising an elongated carrier having at least two carrier elements spaced apart from each other which are connected with each other at their ends by a respective connecting element, wherein the carrier has a low torsional stiffness and a high bending stiffness with respect to its longitudinal axis, wherein at least one carrier element has a cross-section having the shape of a segment of a circle.

18. The connecting strut according to claim 17, wherein the carrier elements have no angled area in a cross-section thereof.

19. The connecting strut according to claim 17, wherein at least one support element is provided which encloses the carrier elements on a periphery thereof.

20. The connecting strut according to claim 17, wherein at least one connecting element is formed of a bearing.

* * * * *